W. A. Torrey,
Wringer Roll,
No. 62,164.  Patented Feb. 19, 1867.
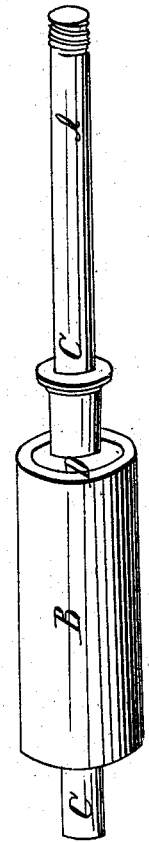
Witnesses
Peter Van Outwerp
David Jacobus
Inventor
William A. Torrey

United States Patent Office.

WILLIAM A. TORREY, OF MONT CLAIR, NEW JERSEY.

Letters Patent No. 62,164, dated February 19, 1867.

---

IMPROVEMENT IN THE MANUFACTURE OF ELASTIC ROLLS.

---

The Schedule referred to in these Letters Patent and making part of the same.

---

TO ALL WHOM IT MAY CONCERN:

Be it known that I, WILLIAM A. TORREY, of Mont Clair, in the county of Essex, and State of New Jersey, have invented a new and useful Improvement in the Mode of Constructing Rollers for Wringing Machines and other purposes; and I do hereby declare that the following is a full and exact description thereof, reference being had to the accompanying drawings, and the letters of reference marked thereon.

The object of my invention is to overcome the difficulty heretofore experienced in firmly uniting rollers made of elastic gums to the shafts or spindles on which they are revolved, especially those used in the construction of wringing machines, and for all other purposes where elastic rollers are required to be revolved under pressure. These rollers require a considerable degree of elasticity; and when revolving in contact with each other under pressure, or against a resisting body, the parts immediately connected with the shaft or spindle on which they revolve yield sufficiently to loosen their hold, seriously affecting their efficiency and durability.

My improvement consists in applying to the construction of these rollers two or more vulcanizable compounds, one of gutta percha, and the other of India rubber, or other vulcanizable elastic gums, cementing the former in immediate contact with the shaft or spindle, and forming the body of the roller of the latter, and cementing and vulcanizing the two together, as hereinafter explained.

To enable others skilled in the art to make and use my invention, I will proceed to describe its construction and operation.

I take a common shaft or spindle, A, made of metal, or other suitable material, of sufficient length to allow the formation of the required roller B, (of which a small portion has been cut off to exhibit the layer of gutta-percha compound,) leaving sufficient space, C C, between the ends of the roller and both ends of the shaft or spindle for suitable bearings to connect with a proper framework, and for the attachment of cranks, pulleys, or other suitable mechanism for revolving it. This shaft or spindle is roughened or serrated on that part of the surface around which the roller is to be formed. Around this shaft or spindle I form the roller by first wrapping around it a layer of a compound of gutta percha, D, prepared for vulcanization in the manner familiar to persons skilled in the art of preparing such gums for that operation, first, however, spreading on the surface of said layer, which is to come in immediate contact with the shaft or spindle, a cement composed of gutta-percha gum dissolved in naphtha, gasoline, benzine, or their chemical equivalents. This layer of gutta-percha compound should be at least an eighth of an inch thick; but this may and ought to be varied according to the thickness of the India-rubber or elastic compound, so that it should constitute about one-tenth of the whole body of the roller. After this layer of gutta-percha compound has been placed in position, I apply the cement above described to its outer surface, and then form the main body of the roller around it of a compound of India rubber, or other vulcanizable elastic gums, prepared, also, for vulcanization in the manner well known to persons skilled in the art of compounding and preparing such gums for that operation. This may be either put on in sheets or layers until the required size of the roller is obtained, or it may be put on in one piece of suitable thickness, and the edges cemented together. The whole is then vulcanized on the shaft or spindle by submitting it to the proper degree of heat, which, for the ordinary compounds of both gutta percha and India rubber, will be about 250° Fahrenheit's scale. The gutta-percha compound, being of a firmer and less elastic nature than India rubber, adheres to the shaft or spindle with far greater tenacity than the rubber compound can be made to do; and the rubber compound, through the action of the cement and vulcanizing process, becoming firmly united to the gutta-percha compound, the whole roller is securely and permanently fastened to the shaft or spindle.

What I claim as my invention, and desire to secure by Letters Patent, is—

Securing rollers constructed of India rubber and other vulcanizable elastic gums to shafts or spindles by the use and application of the compounds and cement substantially as and for the purposes set forth.

WILLIAM A. TORREY.

Witnesses:
PETER VAN ANTWERP,
DAVID JACOBUS.